United States Patent [19]

Dunn, Jr.

[11] 4,085,189

[45] Apr. 18, 1978

[54] PROCESS FOR RECYCLE BENEFICIATION OF TITANIFEROUS ORES

[76] Inventor: Wendell E. Dunn, Jr., Star Route 68D, Spearfish Canyon, S. Dak. 57733

[21] Appl. No.: 688,719

[22] Filed: May 21, 1976

Related U.S. Application Data

[63] Continuation-in-part of Ser. No. 4,563, Jan. 21, 1970, abandoned, and Ser. No. 267,519, Jun. 29, 1972, abandoned.

[51] Int. Cl.² .................. C01G 23/04; C01G 49/10
[52] U.S. Cl. ................................. 423/74; 423/148; 423/149; 423/610
[58] Field of Search ............... 423/83, 659 F, 148, 423/149, 610, 74

[56] References Cited

U.S. PATENT DOCUMENTS

| | | | |
|---|---|---|---|
| 1,760,992 | 6/1930 | Palmer | 423/80 |
| 2,184,884 | 12/1939 | Muskat et al. | 423/75 |
| 2,852,362 | 9/1958 | Daubenspeck et al. | 423/74 |
| 2,876,074 | 3/1959 | Johnson | 423/80 |
| 2,944,884 | 7/1960 | Halverson | 75/33 |
| 3,112,178 | 11/1963 | Judd | 423/80 |
| 3,414,402 | 12/1968 | Volk et al. | 75/26 |
| 3,421,884 | 1/1969 | Pfeiffer et al. | 423/148 |
| 3,457,037 | 7/1969 | Aramendia et al. | 423/86 |
| 3,699,206 | 10/1972 | Wendell, Jr. | 423/659 X |

OTHER PUBLICATIONS

Chemical Engineering Progress, vol. 55, No. 10, Oct. 1959, pp. 80–88.

*Primary Examiner*—Edward Stern

[57] ABSTRACT

An improved process for beneficiating titaniferous ore to produce essentially iron-free titanium dioxide wherein a fluidized mixture of ore and a recycled iron-containing partially chlorinated product fraction is contacted with chlorine in a reactor maintained under reducing conditions, at temperatures of 700° to 1150° C. to convert iron oxide in the ore to iron chloride vapor which is removed from the reaction mixture. A quantity of the reaction bed which is partially chlorinated is removed from the reactor, cooled and separated into an essentially pure titanium dioxide fraction and a partially chlorinated iron-containing fraction. The iron-containing fraction is mixed with fresh ore and recycled to the reactor for further processing. The titanium dioxide product is useful as a starting material for the preparation of titanium dioxide pigment and is useful as a coating for a welding rod.

4 Claims, 2 Drawing Figures

Process for Recycle Beneficiation of Titaniferous Ores

Effect of Ore Recycle On CO+Cl₂ Beneficiation Rate

PROCESS FOR RECYCLE BENEFICIATION OF TITANIFEROUS ORES

REFERENCE TO PRIOR APPLICATION

This is a continuation-in-part of my application Ser. No. 4,563, filed Jan. 21, 1970, now abandoned and a continuation-in-part of my copending application Ser. No. 267,519 filed June 29, 1972, now abandoned.

FIELD OF THE INVENTION

This invention relates to a process for the treatment of titaniferous ores to produce titanium dioxide.

SUMMARY OF THE INVENTION

This invention is directed to a process for beneficiating titaniferous ore, e.g., producing an essentially pure titanium dioxide from titaniferous ore containing iron oxides, titanium dioxide and minor amounts of other metal oxide contaminants which comprises the steps in sequence: (a) contacting a bed of a particulate titaniferous ore with chlorine gas under reducing and fluidizing conditions in a gas-solids reactor while maintaining the content of iron oxide in the bed at at least 5 percent, by weight, calculated as $Fe_2O_3$, and at an elevated temperature to form a partially chlorinated bed; (b) withdrawing from the reactor vaporized iron chloride and other vaporized metal chlorides; (c) withdrawing a quantity of the partially beneficiated chlorinated bed; (d) separating the withdrawn quantity of the bed into a first essentially iron oxide free titanium dioxide product fraction and a second iron oxide containing fraction; and (e) introducing into the reactor a mixture comprising said second iron-containing fraction and fresh ore and repeating steps (a) through (e).

This invention is directed to an improved chlorination process for beneficiating titaniferous ore, which can be conducted either continuously or batch-wise, wherein a bed of titaniferous ore in a reactor is contacted with chlorine under reducing conditions such as carbon monoxide or 10 to 33 percent, by weight, or more of carbon, at an elevated temperature above the vaporization temperature of iron chlorides and the iron chlorides and other metal chlorides are removed by volatilization, and a quantity of the partially beneficiated chlorinated bed is withdrawn either continuously or batch-wise, separating said quantity of the bed into a first essentially pure titanium dioxide product fraction and a second iron oxide containing fraction and recycling the second iron oxide-containing fraction with fresh ore to the reactor to maintain a bed of ore with iron oxide content of at least five percent, by weight, calculated as $Fe_2O_3$.

More specifically this invention is directed to a continuous process for producing a novel titanium dioxide composition containing 95 to 98 percent, by weight, of titanium dioxide and not more than 1.5 percent, by weight, of iron oxides calculated as $Fe_2O_3$ wherein said process minimizes the loss of titanium values by repressing the amount of titanium tetrachloride produced comprising:

(a) continuously reacting, at elevated temperatures with chlorine, chlorine mixed with a diluent gas, a mixture of chlorine and carbon monoxide or a mixture of chlorine, carbon monoxide and a diluent gas said diluent gas being selected from the group consisting of air, oxygen, carbon dioxide, nitrogen and mixtures thereof through a bed of particular titaniferous ore in a reactor, under reducing and fluidizing conditions, to form a partially beneficiated bed of ore containing at least five percent, by weight, of iron oxide, calculated as $Fe_2O_3$, and vaporizing and withdrawing from the reactor ferrous chloride, ferric chloride or mixtures of ferrous chloride and ferric chloride, diluent gas and traces of carbon monoxide, carbon dioxide, other vaporized metal chlorides, titanium tetrachloride and unreacted chlorine;

(b) continuously withdrawing a portion of the partially beneficiated chlorinated bed;

(c) continuously cooling the withdrawn portion of the partially chlorinated bed under non-oxidizing or reducing conditions;

(d) continuously separating the product of step (c) into a first fraction having an iron oxide content greater than 1.5 percent, by weight, and a titanium dioxide content of less than 95 to 98 percent, by weight, and a second fraction having 95 to 98 percent, by weight, of titanium dioxide and less than 1.5 percent, by weight, of iron oxide, calculated as $Fe_2O_3$;

(e) continuously returning the first fraction to the reactor mixed with sufficient fresh titaniferous ore whereby a constant bed depth is maintained and said bed contains at least 5 percent, by weight, of iron oxides, calculated as $Fe_2O_3$ thereby repressing the loss of titanium values by the formation of titanium tetrachloride; and (f) continuously repeating steps (a) through (e).

The beneficiated ore product e.g., the essentially iron-oxide free titanium dioxide product, is useful to produce titanium dioxide pigments for paints and as a filler for rubber and paper and a component for welding rods.

DESCRIPTION OF THE PREFERRED EMBODIMENTS

Previous to my invention, chlorination processes for the beneficiation of titaniferous ores were deficient because they resulted in losses of titanium values to achieve the desired reduction of iron content to less than about 1.5% of $Fe_2O_3$, by weight. The long chlorination time required to achieve this desired iron concentration resulted in a titanium dioxide product having a large proportion of fines. The presence of fines can result in loss of titanium values in the chloride process for manufacturing $TiO_2$ pigment.

This invention is directed to an improved chlorination process for removing iron oxides from a titaniferous ore, such as ilmenite and titanomagnetite, to produce an essentially pure titanium dioxide wherein the ore, under reducing conditions, is reacted with chlorine at an elevated temperature to convert iron oxide and other metal oxide contaminants in the ore into vaporized iron chloride and other metal chlorides, the improvement consisting of removing a part of the partially chlorinated ore which is separated into a first essentially iron oxide-free product fraction and another iron oxide-containing fraction; said other fraction being recycled to the reactor. Unexpectedly, my process produced the beneficial result of minimizing the amount of titanium values lost. By my process less than 5%, by weight, of the original titanium content of the ore is lost and generally less than 1.0% is lost to $TiCl_4$ formation with some titanium values being lost as dust.

Preferably the process is conducted continuously, although the process can be conducted batch-wise.

The product produced by the process of this invention is essentially pure, iron oxide-free, titanium dioxide. By essentially pure titanium dioxide it is meant a product containing, by weight, 95 to 98% titanium dioxide, 1.5 to 0.1% iron oxide, small amounts of chlorinable metal oxides (generally less than 0.2% and preferably 0.1% or less) with the remainder being non-chlorinable silicates and other non-chlorinable substances.

Referring to the drawings.

Figure 1:
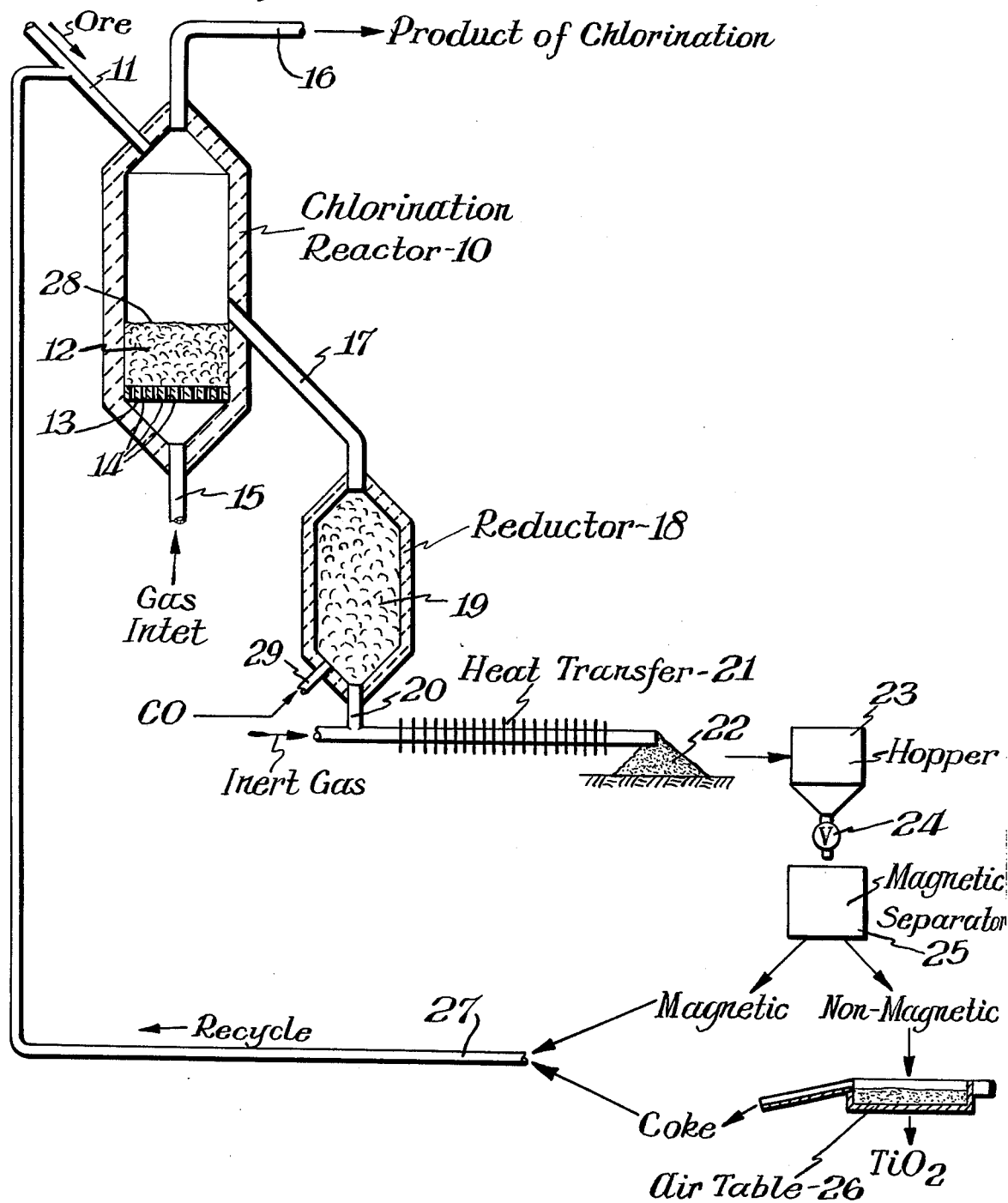
FIG. 1 is a diagrammatic view of the chlorination process.

In FIG. 1, ore (and coke if used) can be preheated to reaction temperature in a preheater (not shown) and introduced into the chlorination reactor 10 also called a chlorinator through feed tube 11 to form a bed of ore 12 which becomes fluidized when chlorine or chlorine and carbon monoxide when coke is not present, are passed through it. The chlorinator, which is composed of corrosion-resistant materials such as quartz, ceramic and the like, capable of withstanding contact with chlorides at temperatures in excess of 1050° C. is preferably operated at temperatures of 700°-1150° C. and preferably 950°-1050° C., and most preferred 980° to 1080° C. The ore bed rests on a fritted disc or perforated plate 13. When a perforated disc is used, the holes 14 therein, preferably, have diameters of 1/32 to 3/32 inch. The chlorination reaction can be performed in any standard gas-solids contactor, preferably in a vertical position. Recycle ore and coke if used plus make-up ore and carbon or coke, preferably, is dispersed into the top of the chlorinator. This recycle feed also can be introduced into the reactor at a point below the surface of the fluidized bed. The contents of the reactor are agitated by the reactant gas or gases introduced into the bottom of the chlorinator through lines 15. At the reaction temperature unreacted gases, diluent gases, if any, by-product gas such as carbon dioxide and vaporized metal chlorides are removed from the reactor through exit pipe 16. The partially chlorinated product is conducted via line 17 to a reductor 18 wherein this product 19 is contacted with a reducing gas such as carbon monoxide, methane or nitrogen which is introduced into the reductor through pipe 29. The product is conveyed by means of inert gas introduced into pipe 20 to a cooler 21 which may be air cooled by fins 21 or water cooled (not shown). The cooled product 22 is conveyed to a hopper 23 from which by valve 24 it is introduced into a magnetic separator 25 wherein the product is separated into a magnetic and non-magnetic fractions. The non-magnetic product is conveyed to an air table 26 where unreacted carbon or coke is separated therefrom. The magnetic fraction and the unreacted coke are recycled through pipe 27 back to the reactor with additional make-up ore to maintain the bed depth 28.

Figure 2:
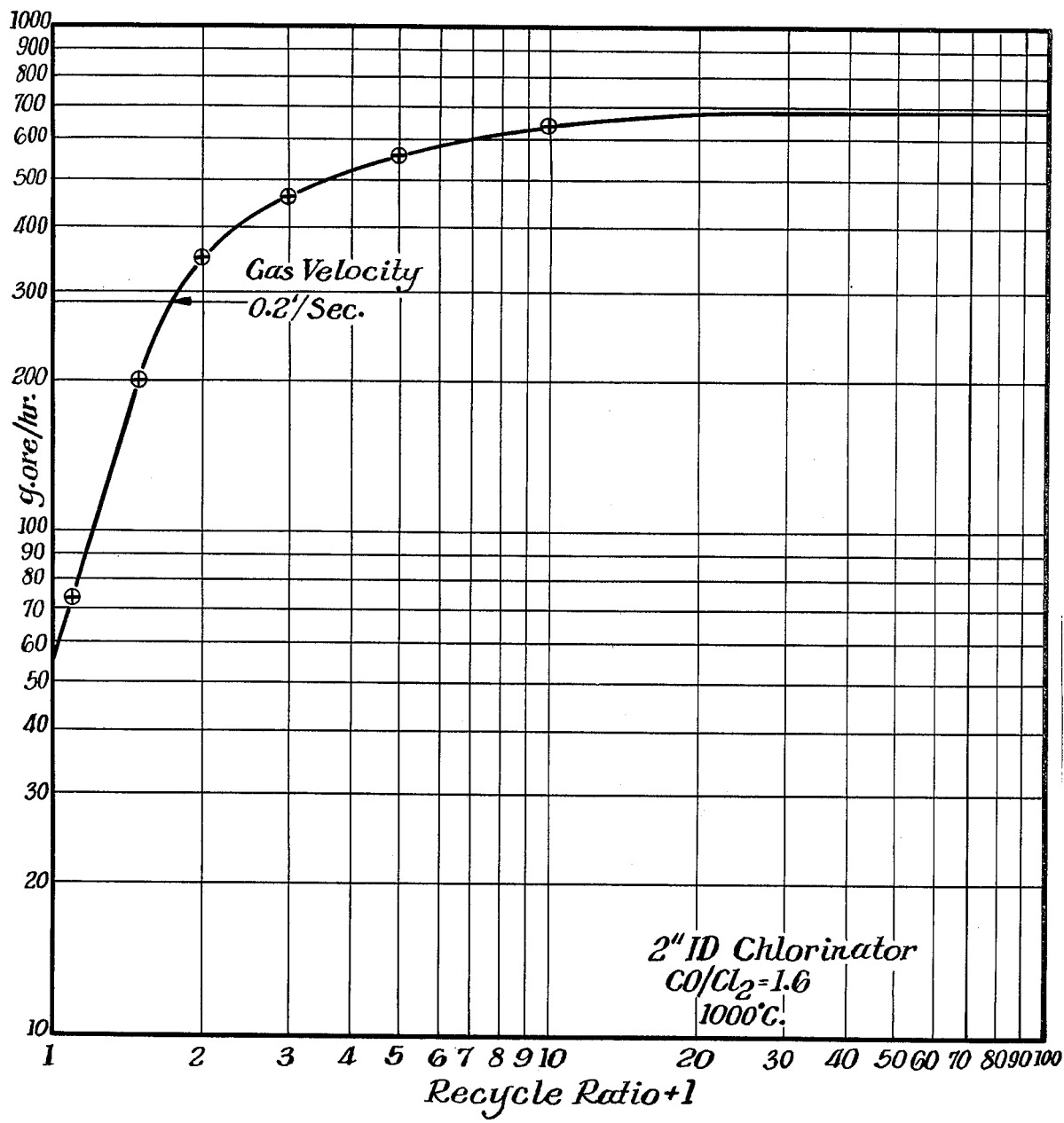
FIG. 2 is a log.-log plot of the effect of recycle on rate of chlorination.

In FIG. 2 the effect of recycle on the production rate of beneficiated ilmenite is shown. One sees from this curve that nearly 200g./hr. of ilmenite for example, Cable ilmenite from western Australia can be beneficiated to a product quality containing less than 1.5% iron, calculated as $Fe_2O_3$, provided a high recycle rate is used. On the other hand, with a low recycle rate which is less in amount than the feed rate, the production falls below 100 g./hr. At this low recycle $TiCl_4$ losses would also be excessive.

The processes of this invention minimize and hold to a small amount the formation of titanium tetrachloride by maintaining an ore reaction mixture in the chlorinator with an average iron content, calculated as $Fe_2O_3$, preferably above 10%, by weight. The average content of iron, calculated as $Fe_2O_3$, can be lower than five percent, by weight, of the reaction mixture, however, at these levels of iron a significant amount of titanium tetrachloride is formed. The average bed $Fe_2O_3$ content is 12%, by weight, of the bed material.

In general, it is convenient to run the processes in such a manner wherein the average residence time of a beneficiated particle in the reactor is about 30 minutes, although shorter or longer time can be used. Preferably, the entire volume of the reactor is replaced on an average of once in ten minutes.

The reactor, which can also be called a chlorinator can be constructed of quartz or a ceramic such as fire brick or a steel or stainless steel reactor lined, at least where the bed would come in contact with the reactor sides, ceramic or refractory brick or the like. The materials of construction for the reactor preferably, should be capable of withstanding contact with a mixture containing chlorine, titanium tetrachloride, ferrous and ferric chloride, carbon monoxide and oxygen and the abrasive action of the fluidized ore bed at temperatures in excess of about 1200° C. However, the process of this invention is conducted at a temperature in the range of 700° to 1150° C.

The chlorine, preferably, is introduced into the reactor at a point below the bed or ore. The ore rests on a porous fritted disc or a perforated plate having a plurality of holes 1/32 to 3/32 inch in diameter. The feed rate of the chlorine into the reactor is maintained such that the chlorine is consumed within the bed of ore and fluidization and, preferably, vigorous fluidization of the bed or ore is maintained and depending upon the depth of the ore bed which preferably is 0.1 to 5.0 feet and can be as much as 10 feet or higher, and most preferred 2 to 3 feet, the rate of flow of chlorine preferably is 0.19 to 2 ft./sec. and most preferred 0.4 to 1.25 ft./sec. The flow rate of chlorine used produces a superficial flow rate of hot gases through the reactor at reaction temperature of about 0.25 ft./sec.

Reducing conditions can be maintained in the reactor by a variety of methods. One method consists of chlorinating a mixture of ore and carbon or other carbonaceous material such as coke, either of coal or petroleum origin and the like. The carbon preferably has a surface area of 12 ft.$^2$/lb. or higher. In this modification of the process of this invention the carbon content of the ore feed stream to the reactor is preferably greater than 33%, by weight, and preferred is 10 to 25%, by weight, and most preferred about 20% by weight.

The chlorination reaction can be conducted under reducing conditions by chlorinating the ore with a mixture containing chlorine and carbon monoxide. In this modification, there should be sufficient carbon monoxide to react with oxygen combined with the iron in the ore. The chlorine gas feed stream can contain excess carbon monoxide and preferably contains carbon monoxide to chlorine in mole ratio of 0.9 to 1 to 10 to 1 and most preferred in a mole ratio of 0.9 to 1 to 1.6 to 1. The flow rate of the mixture introduced into the reactor and preferably at a point below or near the bottom of the ore bed is maintained so that fluidization of the ore bed is maintained and the chlorine component is consumed within the ore bed. This flow rate of the chlorination gas or reaction gas is dependent upon the depth of the ore bed, which is preferably 0.1 to 5.0 feet and most preferred 2 to 3.0 feet, is 0.19 to 2ft./sec. and most preferred 0.19 to 1/25 ft./sec. The flow rate of the reaction gas, i.e., chlorine and air or oxygen, chlorine and diluent chlorine, air or oxygen and diluent, chlorine and carbon monoxide, and chlorine, carbon monoxide and diluent chlorine and carbon monoxide or chlorine when carbon is added to the bed is one which preferably produced a superficial flow rate of hot gases through the reactor heated at reaction temperature of about 0.25 ft./sec., although higher or lower superficial rates can be used.

The rate of flow of gases into the reactor and depth or the ore preferably can be adjusted where entrainment of the smallest beneficiated particle does not occur in order to prevent loss of titanium values.

The reaction temperature can be maintained by externally heating the reactor or the feed streams. Alternately, a small amount of air or oxygen can be added to ignite some of the carbon monoxide or carbon to heat the reactor internally.

Preferably, the ore introduced into the chlorinator should have an average particle size of at least −20 mesh and preferably 90% - 75 mesh. Coke used is powdered and preferably, 4–100 mesh more or less and more preferred 8–80 mesh and most preferred is 4 to 44. Preferably the surface area of the coke is in the range of 10 to 12ft.2/lb. or higher. The coke can be a hard petroleum coke or a bituminous coke having a low hydrogen content.

In the continuous process, the rate of addition of the mixture recycled and fresh ore (and carbon depending upon the reducing conditions) to the reactor selected, preferably maintains the desired bed depth.

The following Examples further illustrate the invention. Unless otherwise, indicated, percentages are by weight.

EXAMPLE I

A 2 ID quartz reactor, electrically heated, with a sintered silica disc to support the fluidized ilmenite solids is operated at 1000° C. with a CO and $Cl_2$ gas input. Ilmenite is fed through a top opening and bed solids removed from a side opening 3 feet above the porous silica disc. Gases containing $FeCl_3$, $FeCl_2$, CO, $CO_2$ and traces of $Cl_2$ and $TiCl_4$ can pass out of the reactor top located 10 feet above the silica disc.

Solids leaving the reactor via the side arm are held in a reducing atmosphere until cooled to room temperature. Cooling is conducted slowly enough to ensure a reduced magnetic state.

Continuous feed of 462 g./hr. of fresh ilmenite mixed with 530g. of recycle bed overflow is magnetically rated on a Carpco laboratory induced magnetic roll separator with magnet current and roll speed adjusted to separate ilmenite particles below 0.5% iron oxide (calculated as $Fe_2O_3$ from the more magnetic fraction which is returned as recycle.

After the bed reaches equilibrium depth and concentration of non-magnetic product less than 0.5% of $Fe_2O_3$ and 95% of $TiO_2$ is made from Cable ilmenite. Manganese oxide values in the product are less than 0.1%, by weight. Chlorine utilization shows 90% $FeCl_2$ and 10% $FeCl_3$ as the gaseous iron chloride product. $TiCl_4$ losses represent less than 5% of the $TiO_2$ fed.

$Cl_2$ feed of 2.62 gmols/hr. and CO feed of 4.03 gmols/hr. sustains a vigorous fluidization at a superficial velocity of 0.32ft./sec. without significant entrainment of beneficiated particles.

EXAMPLE II

In the same reactor described in Example I, which is operated at 1050° C. with a 10% by weight petroleum coke-ilmenite feed combined with a recycle of all the coke separated from the bed overflow and the magnetic fraction (the magnet adjusted to separate 0.5% $Fe_2O_3$ particles as the magnetic fraction) yields a product of $TiO_2$ concentration 95% and MnO 0.1%. The feed rate required is 200 g./hr. Cable ilmenite, 20 g./hr. coke and about 645 g./hr. partially beneficiated ilmenite recycle containing about 15% $Fe_2O_3$. The overflow is reduced by CO and cooled under a reducing condition to avoid reoxidation.

The by-product iron chloride is substantially composed of $FeCl_3$. Chlorine flow rate is 1.61 gmols/hr. diluted by 3.2 gmols $N_2$/hr. The superficial gas velocity is 0.25 ft./sec. based on entering gas quantities.

EXAMPLE III

Using Western Australian ilmenite (Cable),(with an analysis given in Table 1,) was beneficiated in a pilot plant run at 1050° C. with 95% chlorine feed. The product over-flowing the fluidized bed was cooled, sieved to remove coke, and separated into a magnetic and nonmagnetic fraction. The magnetic fraction was used for recycle feed mixed with fresh ore and coke in the succeeding run from which this example is drawn. The recycle fraction analysis is given in Table 1.

The reactor was fed a pre-heated stream of ore, recycle (partially beneficiated magnetic fraction) at a temperature which ranged between 730° and 796° C. generally 750° ± 20° C., adjusted to keep the beneficiator in heat balance. Small amounts of oxygen were added for rapid temperature control. The preheater was fluidized with air and oxygen to hold the desired temperature for beneficiator heat balance. Variation in the ferrous/ferric chloride ratio, as the iron bed content varied, changed the heat needs of the beneficiator.

Both the reactor and preheater vessels were 5.5 feet ID mild steel refractory lined vessels. The beneficiator overflow level was 33 inches from the distributor giving a static bed height of 26 inches. The space above the beneficiator bed was used for oxidation of iron chlorides, predominately ferrous chloride.

Table II gives feed ratio to the beneficiator and preheater. The product was magnetically separated after coke removal by sieving. The analysis of the product is given in Table I. Over 99% of the particulate coke used was + 52 mesh. Product analyses are on a coke-free basis. Operation was continuous for 12 hours with a total feed. The conditions, residence times of preheater and beneficiator are given in Table III. Mass balance over a series of five runs of which this example was one averaged 95.0% for titanium dioxide.

The beneficiator bed concentration are given in Table IV. The iron concentration which was high due to an initial bed of magnetics was reduced until it achieved a steady state iron oxide concentration of 4.2% which is 4.2%, by weight, of the bed material. At the end of the run, the iron content was raised to 6.1% or 10.9% of the bed weight as $Fe_2O_3$.

TABLE

| RAW MATERIAL AND PRODUCT ANALYSES | | |
|---|---|---|
| | %$TiO_2$ | Total %Fe |
| Cable ilmenite | 54.5 | 30.59 |

TABLE -continued

RAW MATERIAL AND PRODUCT ANALYSES

| | %TiO$_2$ | Total %Fe |
|---|---|---|
| Mag. recycle | 75.8 | 14.79 |
| Non-mag. product | 95.6 | 1.0 |

TABLE II

BENEFICIATOR FEED RATES

| | | |
|---|---|---|
| Great Lakes Petroleum Coke | 18.5 | lb/min. |
| Cable ilmenite | 61.0 | lb/min. |
| Recycle Magnetics | 13.0 | lb/min. |
| Chlorine | 150 | SCFM |
| Oxygen/nitrogen or air | 37 | SCFM |

TABLE III

PREHEATER AND BENEFICIATOR RESIDENCE TIMES AND CONDITIONS

| | Preheater | Beneficiator |
|---|---|---|
| Solids | 40 min. | 90 min. |
| Gas | 1.9 Sec. | 5 sec. |
| Pressure | 4.7 Psig. | 4.5 psig. |
| Temperature | 720–796° C. | 1050° C. |
| Gas Sup. Vel. | .75'/sec. | .5°/sec. |

TABLE IV

BENEFICIATOR BED CONCENTRATIONS AND CHLORINE LOSS TO TiCl$_4$

| Time of day | Wt%Fe$_2$O$_3$ Total Bed | % by Wt Fe in Beneficiate | Wt % Coke | % Cl$_2$ Loss To TiCl$_4$ 1Note No. 1 |
|---|---|---|---|---|
| 13.15 | 7.0 | 4.3 | 18 | 2.2 |
| 16.14 | 7.3 | 4.1 | 20 | 3.3 |
| 19.15 | 7.4 | 4.3 | 17 | 3.8 |
| 21.19 | 11.9 | 6.8 | 18 | 2.9 |
| 23.15 | 10.9 | 6.1 | 20 | 3.6 |

Note No. 1
This Cl$_2$ to TiCl$_4$ was calculated from TiO$_2$ in the Byproduct iron oxide since TiO$_2$ dust losses are also with the iron oxide the loss of chlorine is overstated by this calculation. Since the TiCl$_4$ is later oxidized the Cl$_2$ is recovered at the expense of oxygen and lost TiO$_2$ values.

The withdrawn partially chlorinated product can be cooled under reducing condition or preferably non-oxidizing conditions. For example, the product can be cooled under reducing conditions by cooling carbon monoxide or methane to the temperature where residual iron oxide is reduced to magnetic FeO or Fe$_3$O$_4$, and conveniently the cooling is to room temperature. The beneficiate mixed with carbon can be cooled under nonoxidizing conditions using nitrogen or carbon dioxide. Also in the presence of carbon and under about 600° C., the product mixed with carbon can be cooled to room temperature in air and the mixture obtained is sufficiently magnetic to be separated by a magnetic separator. The cooled, partially chlorinated, reaction product is passed through a conventional magnetic separator to effect a separation into a first non-magnetic or low magnetic fraction containing less than 1.5% iron oxide as Fe$_2$O$_3$ along with residual coke, if any is present, and a second magnetic or high magnetic fraction containing more than 1.5% iron oxide as Fe$_2$O$_3$. The second fraction is recycled in the process. The non-magnetic fraction is essentially pure titanium dioxide in the modification of this invention using carbon monoxide. When carbon is mixed with ore, residual carbon can be separated from the product by passing the non-magnetic fraction through an air tabling device which passes a stream of air through the stream to separate the less dense carbon particles from the denser, essentially pure titanium dioxide product. Alternately, the partially chlorinated product can be separated into an essentially pure product fraction and an iron oxidecontaining fraction by density classification.

The separation process can be conveniently used with ores containing calcium. Calcium when present in the ore is converted into calcium chloride which is not vaporized and removed at the reaction temperatures. The presence of calcium chloride is undesirable because it decreases the flow properties of the product, especially in the presence of atmospheric moisture due to its hydroscopic nature. The calcium chloride can be separated from the leaching solution. The leaching step consists of contacting the essentially pure titanium dioxide product fraction with water followed by drying.

The invention produces a product having particles which have had a more uniform chlorination history. The beneficiation process involves the removal of metal oxides (predominantly iron oxide with minor amounts of manganese, vanadium and other metal contaminants) which are more or less uniformly distributed throughout the ore particles. The contaminants located in the center of the ore particles are more difficult to chlorinate than contaminants near the surface of the ore particles. The process of this invention allows a recovery of the beneficiated product from product having a residual iron and thus minimizes the contact of beneficiated product with chlorine.

Prior to my invention, chlorination beneficiation processes were not considered desirable since they would result in a large loss of titanium values to produce a product having low iron content. Chlorination beneficiation resulted in production of a relatively more porous product having a relatively larger amount of fines. Titanium dioxide which is porous and contains a large amount of fines is undesirable since its use in the chlorination process for the production of titanium dioxide pigment can result in the loss of titanium values. The product produced by the process of this invention is relatively less porous and, in general, contains less of the undesirable fines.

The product produced by this reaction is off-white to light yellow in color. The product has a surface area of 0.1 –0.5m$^2$/g. and does not absorb H$_2$O or bind hydroxyls to its Ti surface.

As stated hereinabove, the titanium dioxide products produced by the process of this invention are useful as an intermediate for titanium dioxide pigment. The products can be used directly as a pigment. The product is also useful as a welding flux and in this use is applied as a coating to welding rods.

The foregoing detailed description has been given for clarity of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A continuous process for producing a novel titanium dioxide composition containing 95 to 98 percent, by weight, of titanium dioxide and not more than 1.5 percent, by weight, of iron oxide calculated as Fe$_2$O$_3$ from a titanium ore containing trace metals as oxides wherein said process minimizes the loss of titanium values by repressing the amount of titanium tetrachloride produced, comprising:

(a) continuously reacting, at elevated temperatures with a member selected from the group consisting of chlorine, chlorine mixed with a diluent gas, a mixture of chlorine and carbon monoxide and a mixture of chlorine, carbon monoxide and a diluent gas said diluent gas being selected from the group consisting of air, oxygen, carbon dioxide, nitrogen and mixtures thereof a bed of a particulate titaniferous ore in a reactor, under reducing and fluidizing conditions, to form a partially beneficiated bed of ore containing at least 5 percent, by weight, or iron oxide, calculated as $Fe_2O_3$, and vaporizing and withdrawing from the reactor ferrous chloride, ferric chloride, diluent gas, traces of carbon monoxide, carbon dioxide, vaporized metal chlorides, titanium tetrachloride and unreacted chlorine;

(b) continuously withdrawing a portion of the partially beneficiated bed;

(c) continuously cooling the withdrawn portion of the partially chlorinated bed under non-oxidizing or reducing conditions;

(d) continuously separating the product of step (c) into a first magnetic fraction having an iron oxide content greater than 1.5 percent, by weight, and a titanium dioxide content of less than 95 to 98 percent, by weight, and a second nonmagnetic fraction having 95 to 98 percent, by weight, of titanium dioxide and less than 1.5 percent, by weight, of iron oxide, calculated as $Fe_2O_3$;

(e) continuously returning the first partially beneficiated ore mixture to the reactor mixed with sufficient fresh titaniferous ore whereby a constant bed depth is maintained and said bed contains at least 5 percent, by weight, of iron oxides, calculated as $Fe_2O_3$, thereby repressing the loss of titanium values by the formation of titanium tetrachloride; and (f) continuously repeating steps (a) through (e).

2. The process of claim 1 comprising performing the following steps continuously:

(a) contacting, at a temperature of 700° to 1080° C., the bed with 10–33 percent, by weight, of carbon or coke with gaseous chlorine under fluidizing conditions with sufficient chlorine to vaporize iron values and other chlorinated metal oxides in the ore to form a partially beneficiated bed;

(b) withdrawing a portion of the partially beneficiated bed;

(c) cooling the withdrawn portion of the bed under a non-oxidizing atmosphere whereby unreacted iron value in the bed in the presence of said carbon or coke is maintained in a magnetic state;

(d) Continuously separating the product of step (c) into a first magnetic fraction having an iron oxide content greater than 1.5 percent, by weight, and a titanium dioxide content of less than 95 to 98 percent, by weight, and a second nonmagnetic fraction having 95 to 98 percent, by weight, of titanium dioxide and less than 1.5 percent, by weight, of iron oxide, calculated as $Fe_2O_3$;

(e) introducing into the reactor bed a mixture comprising said first partially beneficiated magnetic ore mixture and sufficient fresh ore to maintain a constant bed level and the iron oxide content of the bed in the range of 5 to 12 percent, by weight, calculated as $Fe_2O_3$.

3. The process of claim 2 wherein step (a), comprises contacting the bed, having a depth of 0.1 to 5 feet measured under static conditions and said bed is composed of ilmenite mixed with coke, said bed being 10–25 percent, by weight, coke, with gaseous chlorine at a velocity of 0.19 to 2 feet per second.

4. A continuous process which comprises:

(a) continuously reacting the bed of titaniferous ore with a mixture of gaseous carbon monoxide and chlorine in a gas-solids reactor at a fluidizing velocity to produce a partially beneficiated bed;

(b) continuously withdrawing a portion of the partially beneficiated bed;

(c) continuously cooling the withdrawn portion of the partially beneficiated bed under a non-oxidizing atmosphere to maintain unreacted iron oxide in the ore in a magnetic state;

(d) continuously separating the product of step (c) into a first magnetic fraction having an iron oxide content greater than 1.5 percent, by weight, and a titanium dioxide content of less than 95 to 98 percent, by weight, and a second nonmagnetic fraction having 95 to 98 percent, by weight, of titanium dioxide and less than 1.5 percent, by weight, of iron oxide, calculated as $Fe_2O_3$;

(e) continuously returning the first partially beneficiated magnetic ore mixture to the reactor mixed with sufficient fresh titaniferous ore whereby a constant bed depth is maintained and said ore in the bed contains at least 5 percent, by weight, of iron oxides calculated as $Fe_2O_3$, thereby repressing the loss of titanium values by the formation of titanium tetrachloride; and (f) continuously repeating steps (a) through (e).

* * * * *